United States Patent
Horner et al.

(10) Patent No.: US 10,934,004 B2
(45) Date of Patent: Mar. 2, 2021

(54) DETECTION OF NOISE IN PRESSURE SENSOR AND PREDICTION OF PRESSURE SENSORS DRIFT IN CABIN PRESSURE CONTROL SYSTEM/AIR DATA COMPUTER SYSTEM/ENVIRONMENTAL CONTROL SYSTEMS

(71) Applicant: HONEYWELL INTERNATIONAL INC., Morris Plains, NJ (US)

(72) Inventors: Darrell Horner, Oro Valley, AZ (US); Vemuri Kalichakradhar, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 363 days.

(21) Appl. No.: 15/918,867

(22) Filed: Mar. 12, 2018

(65) Prior Publication Data
US 2019/0276154 A1    Sep. 12, 2019

(51) Int. Cl.
*B64D 13/04* (2006.01)
*B64F 5/60* (2017.01)
(Continued)

(52) U.S. Cl.
CPC ............... *B64D 13/04* (2013.01); *B64F 5/60* (2017.01); *G01L 27/002* (2013.01); *G07C 5/0808* (2013.01)

(58) Field of Classification Search
CPC ......... B64D 13/04; B64F 5/60; G01L 27/002; G01L 27/007; G07C 5/008; G07C 5/0808
See application file for complete search history.

(56) References Cited

U.S. PATENT DOCUMENTS 6,234,148 B1 *  5/2001  Hartke ................. F02D 41/222
                                                    123/198 D
6,422,088 B1 *  7/2002  Oba ....................... G01D 3/08
                                                    73/754

(Continued)

OTHER PUBLICATIONS

DeVor et al., "Statistical Quality Design and Control; Contemporary Concepts and Methods—Chapter 5; Statistical Basis for Shewhart Control Charts for Variable Data," Macmillan Publishing Company Inc., 18 pp. (Applicant points out, in accordance with MPEP 609.04(a), that the year of publication, 1992, is sufficiently earlier than the effective U.S. filing date, so that the particular month of publication is not in issue.).

(Continued)

*Primary Examiner* — Elias Desta
(74) *Attorney, Agent, or Firm* — Shumaker & Sieffert, P.A.

(57) ABSTRACT

A pressure control system for an environment to be pressurized includes a controller configured to calculate at least one of: a calculated pressure sensor rate of change error; and a calculated pressure sensor error. The calculated sensor rate of change error is based on a plurality of first environment air pressure signals over a first time period; and the calculated sensor error is based, over a second period of time, a difference between ambient air pressure signals and second environment air pressure signals. A processor in communication with the controller is configured to compare at least one of: the calculated pressure sensor rate of change error with at least one pressure sensor rate of change error control limit; and the calculated pressure sensor error with at least one pressure sensor error control limit. The at least one pressure sensor rate of change error control limit is based on past pressure sensor rate of change errors; and the at least one pressure sensor error control limit is based on past pressure sensor errors.

20 Claims, 11 Drawing Sheets

(51) Int. Cl.
  *G07C 5/08* (2006.01)
  *G01L 27/00* (2006.01)

(56) References Cited

U.S. PATENT DOCUMENTS

| | | | |
|---|---|---|---|
| 6,889,554 B2* | 5/2005 | Hirota | G01L 19/02 |
| | | | 73/719 |
| 7,859,381 B2 | 12/2010 | Chen et al. | |
| 8,260,531 B2* | 9/2012 | Yasuda | F02D 35/023 |
| | | | 123/435 |
| 9,349,226 B2 | 5/2016 | Sundareswara et al. | |
| 2010/0076711 A1 | 3/2010 | Beekhuizen et al. | |
| 2016/0314632 A1 | 10/2016 | Lu et al. | |

OTHER PUBLICATIONS

DeVor et al., "Statistical Quality Design and Control; Contemporary Concepts and Methods—Chapter 6; Construction and Interpretation of Shewhart Control Charts for Variable Data," Macmillan Publishing Company Inc., 46 pp. (Applicant points out, in accordance with MPEP 609.04(a), that the year of publication, 1992, is sufficiently earlier than the effective U.S. filing date, so that the particular month of publication is not in issue.).

* cited by examiner

| ◢ | A | B | D | E | F |
|---|---|---|---|---|---|
| 1 | Ambient Pressure | Cabin (Environment) Pressure | Pressure Error (Pc-Pa) | Environment Pressure Rate of Change Error | |
| 2 | 13.4768 | 13.48328 | 0.006481 | -4.58E-05 | |
| 3 | 13.4768 | 13.48329 | 0.006496 | 4.58E-05 | |
| 4 | 13.4768 | 13.48332 | 0.006527 | 0.000153 | |
| 5 | 13.4768 | 13.48312 | | -6.10E-05 | |
| 6 | 13.4768 | 13.48329 | | -0.00011 | |
| 7 | 13.4768 | 13.48332 | | 0.000137 | |
| 8 | 13.4768 | 13.48318 | | 3.05E-05 | |
| 9 | 13.4768 | 13.48338 | | 7.63E-05 | |
| 10 | 13.4768 | 13.48318 | | 6.10E-05 | |
| 11 | 13.4768 | 13.48334 | | 1.53E-05 | |
| 12 | 13.4768 | 13.48337 | | 0.000244 | |
| 13 | 13.4768 | 13.48331 | | 0.000259 | |

FIG. 3

| A | B | C | D | E | F | G | H | I | J | K | L | M | N | O | P | Q |
|---|---|---|---|---|---|---|---|---|---|---|---|---|---|---|---|---|
| | | | | Cabin Pressure Error | | | | | | | | Cabin Pressure Rate | | | | |
| | | | Lower Control | Upper Control | | | | | | | Lower Control | Upper Control | | | | |
| FLIGHT NO. | -bar Pc (psi | X-DBL BAR | Limit (LCL) | Limit (UCL) | R | R-bar | R-LCL | R-UCL | X-bar | X-DBL BAR | Limit | Limit | R | R-bar | R-LCL | R-UCL |
| FLIGHT 1 | 0.00650152 | 0.00523896 | 0.00324531 | 0.0072326 | 4.5764E-05 | 0.000130463 | 0 | 0.000335811 | 5.09E-05 | -2.59E-05 | -2.78E-04 | 2.26E-04 | 1.98E-04 | 0.0001495 | 0 | 0.000384906 |
| FLIGHT 2 | 0.0055088 | 0.00523896 | 0.00324531 | 0.0072326 | 0.000106812 | 0.000130463 | 0 | 0.000335811 | 4.58E-05 | -2.59E-05 | -2.78E-04 | 2.26E-04 | 9.16E-05 | 0.0001495 | 0 | 0.000384906 |
| FLIGHT 3 | 0.0054086 | 0.00523896 | 0.00324531 | 0.0072326 | 0.000213623 | 0.000130463 | 0 | 0.000335811 | -1.27E-04 | -2.59E-05 | -2.78E-04 | 2.26E-04 | 2.75E-04 | 0.0001495 | 0 | 0.000384906 |
| FLIGHT 4 | 0.00446612 | 0.00523896 | 0.00324531 | 0.0072326 | 6.1035E-05 | 0.000130463 | 0 | 0.000335811 | -1.78E-04 | -2.59E-05 | -2.78E-04 | 2.26E-04 | 7.63E-05 | 0.0001495 | 0 | 0.000384906 |
| FLIGHT 5 | 0.00449663 | 0.00523896 | 0.00324531 | 0.0072326 | 0.000213623 | 0.000130463 | 0 | 0.000335811 | 5.09E-06 | -2.59E-05 | -2.78E-04 | 2.26E-04 | 1.22E-04 | 0.0001495 | 0 | 0.000384906 |
| FLIGHT 6 | 0.00479672 | 0.00523896 | 0.00324531 | 0.0072326 | 0.000228882 | 0.000130463 | 0 | 0.000335811 | 4.58E-05 | -2.59E-05 | -2.78E-04 | 2.26E-04 | 1.37E-04 | 0.0001495 | 0 | 0.000384906 |
| FLIGHT 7 | 0.00422197 | 0.00523896 | 0.00324531 | 0.0072326 | 0.000320435 | 0.000130463 | 0 | 0.000335811 | -6.61E-05 | -2.59E-05 | -2.78E-04 | 2.26E-04 | 1.07E-04 | 0.0001495 | 0 | 0.000384906 |
| FLIGHT 8 | 0.00411008 | 0.00523896 | 0.00324531 | 0.0072326 | 7.62939E-05 | 0.000130463 | 0 | 0.000335811 | -1.12E-04 | -2.59E-05 | -2.78E-04 | 2.26E-04 | 2.29E-04 | 0.0001495 | 0 | 0.000384906 |
| FLIGHT 9 | 0.00507138 | 0.00523896 | 0.00324531 | 0.0072326 | 6.1035E-05 | 0.000130463 | 0 | 0.000335811 | -4.07E-05 | -2.59E-05 | -2.78E-04 | 2.26E-04 | 1.98E-04 | 0.0001495 | 0 | 0.000384906 |
| FLIGHT 10 | 0.00566629 | 0.00523896 | 0.00324531 | 0.0072326 | 0.000137329 | 0.000130463 | 0 | 0.000335811 | -1.63E-04 | -2.59E-05 | -2.78E-04 | 2.26E-04 | 1.53E-04 | 0.0001495 | 0 | 0.000384906 |
| FLIGHT 11 | 0.00570297 | 0.00523896 | 0.00324531 | 0.0072326 | 0.00012207 | 0.000130463 | 0 | 0.000335811 | 1.53E-04 | -2.59E-05 | -2.78E-04 | 2.26E-04 | 4.58E-05 | 0.0001495 | 0 | 0.000384906 |
| FLIGHT 12 | 0.00484339 | 0.00523896 | 0.00324531 | 0.0072326 | 9.1527E-05 | 0.000130463 | 0 | 0.000335811 | 8.65E-05 | -2.59E-05 | -2.78E-04 | 2.26E-04 | 1.68E-04 | 0.0001495 | 0 | 0.000384906 |
| FLIGHT 13 | 0.00542288 | 0.00523896 | 0.00324531 | 0.0072326 | 0.000152588 | 0.000130463 | 0 | 0.000335811 | -5.59E-05 | -2.59E-05 | -2.78E-04 | 2.26E-04 | 1.68E-04 | 0.0001495 | 0 | 0.000384906 |
| FLIGHT 14 | 0.00550461 | 0.00523896 | 0.00324531 | 0.0072326 | 7.62939E-05 | 0.000130463 | 0 | 0.000335811 | 5.09E-06 | -2.59E-05 | -2.78E-04 | 2.26E-04 | 9.16E-05 | 0.0001495 | 0 | 0.000384906 |
| FLIGHT 15 | 0.0057284 | 0.00523896 | 0.00324531 | 0.0072326 | 3.0517E-05 | 0.000130463 | 0 | 0.000335811 | 1.02E-05 | -2.59E-05 | -2.78E-04 | 2.26E-04 | 7.63E-05 | 0.0001495 | 0 | 0.000384906 |
| FLIGHT 16 | 0.00618108 | 0.00523896 | 0.00324531 | 0.0072326 | 0.000259399 | 0.000130463 | 0 | 0.000335811 | -3.56E-05 | -2.59E-05 | -2.78E-04 | 2.26E-04 | 1.83E-04 | 0.0001495 | 0 | 0.000384906 |
| FLIGHT 17 | 0.00514857 | 0.00523896 | 0.00324531 | 0.0072326 | 9.1527E-05 | 0.000130463 | 0 | 0.000335811 | -1.02E-04 | -2.59E-05 | -2.78E-04 | 2.26E-04 | 1.53E-04 | 0.0001495 | 0 | 0.000384906 |
| FLIGHT 18 | 0.00586573 | 0.00523896 | 0.00324531 | 0.0072326 | 0.000198364 | 0.000130463 | 0 | 0.000335811 | -2.03E-05 | -2.59E-05 | -2.78E-04 | 2.26E-04 | 2.59E-04 | 0.0001495 | 0 | 0.000384906 |
| FLIGHT 19 | 0.00494003 | 0.00523896 | 0.00324531 | 0.0072326 | 3.0517E-05 | 0.000130463 | 0 | 0.000335811 | -3.56E-05 | -2.59E-05 | -2.78E-04 | 2.26E-04 | 6.10E-05 | 0.0001495 | 0 | 0.000384906 |
| FLIGHT 20 | 0.00618108 | 0.00523896 | 0.00324531 | 0.0072326 | 9.1527E-05 | 0.000130463 | 0 | 0.000335811 | 1.53E-04 | -2.59E-05 | -2.78E-04 | 2.26E-04 | 1.98E-04 | 0.0001495 | 0 | 0.000384906 |

FIG. 4

TABLE H Control Chart Factors for Dispersion - Factors for Range Charts

| No. of Observations in Sample $n$ | $d_2$ | $d_3$ | $d_4$ | $D_1$ | $D_2$ | $D_3$ | $D_4$ | $D_5$ | $D_6$ | $d_2/c_2$ | $d_2/c_4$ |
|---|---|---|---|---|---|---|---|---|---|---|---|
| 2  | 1.128 | 0.853 | 0.954 | 0     | 3.686 | 0     | 3.269 | 0     | 3.68 | 1.999 | 1.414 |
| 3  | 1.693 | 0.888 | 1.588 | 0     | 4.358 | 0     | 2.574 | 0     | 2.67 | 2.340 | 1.910 |
| 4  | 2.059 | 0.880 | 1.978 | 0     | 4.698 | 0     | 2.282 | 0     | 2.33 | 2.581 | 2.235 |
| 5  | 2.326 | 0.864 | 2.257 | 0     | 4.918 | 0     | 2.114 | 0     | 2.14 | 2.767 | 2.474 |
| 6  | 2.534 | 0.848 | 2.472 | 0     | 5.078 | 0     | 2.004 | 0     | 2.02 | 2.917 | 2.663 |
| 7  | 2.704 | 0.833 | 2.645 | 0.205 | 5.203 | 0.076 | 1.924 | 0.055 | 1.94 | 3.044 | 2.704 |
| 8  | 2.847 | 0.820 | 2.791 | 0.387 | 5.307 | 0.136 | 1.864 | 0.119 | 1.88 | 3.154 | 2.950 |
| 9  | 2.970 | 0.808 | 2.915 | 0.546 | 5.394 | 0.184 | 1.816 | 0.168 | 1.83 | 3.250 | 3.064 |
| 10 | 3.078 | 0.797 | 3.024 | 0.687 | 5.469 | 0.223 | 1.777 | 0.209 | 1.79 | 3.336 | 3.164 |
| 11 | 3.137 | 0.787 | 3.120 | 0.812 | 5.534 | 0.256 | 1.744 | 0.243 | 1.75 | 3.412 | 3.253 |
| 12 | 3.258 | 0.778 | 3.207 | 0.924 | 5.592 | 0.284 | 1.716 | 0.272 | 1.72 | 3.481 | 3.333 |
| 13 | 3.336 | 0.770 | 3.285 | 1.026 | 5.646 | 0.308 | 1.692 | 0.297 | 1.70 | 3.545 | 3.406 |
| 14 | 3.407 | 0.762 | 3.356 | 1.121 | 5.693 | 0.329 | 1.671 | 0.319 | 1.68 | 3.604 | 3.473 |
| 15 | 3.472 | 0.755 | 3.422 | 1.207 | 5.737 | 0.348 | 1.652 | 0.338 | 1.66 | 3.659 | 3.535 |
| 16 | 3.532 | 0.749 | 3.482 | 1.285 | 5.779 | 0.364 | 1.636 | 0.355 | 1.64 | 3.709 | 3.591 |
| 17 | 3.588 | 0.743 | 3.538 | 1.359 | 5.817 | 0.379 | 1.621 | 0.370 | 1.63 | 3.757 | 3.644 |
| 18 | 3.640 | 0.738 | 3.591 | 1.426 | 5.854 | 0.392 | 1.608 | 0.383 | 1.61 | 3.801 | 3.694 |
| 19 | 3.689 | 0.733 | 3.640 | 1.490 | 5.888 | 0.404 | 1.596 | 0.396 | 1.60 | 3.843 | 3.741 |
| 20 | 3.735 | 0.729 | 3.686 | 1.548 | 5.922 | 0.414 | 1.586 | 0.407 | 1.59 | 3.883 | 3.785 |
| 21 | 3.778 | 0.724 | 3.729 | 1.606 | 5.950 | 0.425 | 1.575 | 0.418 | 1.58 | 3.920 | 3.825 |
| 22 | 3.819 | 0.720 | 3.771 | 1.659 | 5.979 | 0.434 | 1.566 | 0.427 | 1.57 | 3.955 | 3.865 |
| 23 | 3.858 | 0.716 | 3.810 | 1.710 | 6.006 | 0.443 | 1.557 | 0.436 | 1.56 | 3.990 | 3.902 |
| 24 | 3.895 | 0.712 | 3.847 | 1.759 | 6.031 | 0.452 | 1.548 | 0.445 | 1.55 | 4.022 | 3.938 |
| 25 | 3.931 | 0.709 | 3.882 | 1.804 | 6.058 | 0.459 | 1.541 | 0.452 | 1.54 | 4.054 | 3.972 |
| >25 | $\bar{R}/\sigma$ | $\sigma_R/\sigma$ | $\bar{R}/\sigma$ | $d_2 - 3d_3$ | $d_2 + 3d_3$ | $1 - 3d_3/d_2$ | $1 + 3d_3/d_2$ | $1 - 3d_3/d_4$ | $1 + 3d_3/d_4$ | | |

Values of $c_4$, $B_3$, $B_4$, $B_5$, $B_6$, $d_2$, $d_3$, $D_1$, $D_2$, $D_3$, and $D_4$ are from ASTM-STP 15D by kind permission of the American Society for Testing and Materials.

FIG. 6

| | | | Cabin Pressure Error | | | | | | | | Cabin Pressure Rate | | | | | |
|---|---|---|---|---|---|---|---|---|---|---|---|---|---|---|---|---|
| FLIGHT NO. | -bar Pc (psi | X-DBL BAR | Lower Control Limit (LCL) | Upper Control Limit (UCL) | R | R-bar | R-LCL | R-UCL | X-bar | X-DBL BAR | Lower Control Limit | Upper Control Limit | R | R-bar | R-LCL | R-UCL |
| FLIGHT 1 | 0.00650152 | 0.00523896 | 0.0032431 | 0.0072326 | 4.5776E-05 | 0.000130463 | | 0.000335811 | 5.09E-05 | -2.59E-05 | -2.78E-04 | 2.26E-04 | 1.98E-04 | 0.0001495 | | 0.000384906 |
| FLIGHT 2 | 0.0055088 | 0.00523896 | 0.0032431 | 0.0072326 | 0.000106812 | 0.000130463 | 0 | 0.000335811 | 4.58E-05 | -2.59E-05 | -2.78E-04 | 2.26E-04 | 9.16E-05 | 0.0001495 | 0 | 0.000384906 |
| FLIGHT 3 | 0.00504086 | 0.00523896 | 0.0032431 | 0.0072326 | 0.000213623 | 0.000130463 | 0 | 0.000335811 | -1.27E-04 | -2.59E-05 | -2.78E-04 | 2.26E-04 | 2.75E-04 | 0.0001495 | 0 | 0.000384906 |
| FLIGHT 4 | 0.00446612 | 0.00523896 | 0.0032431 | 0.0072326 | 6.1035E-05 | 0.000130463 | 0 | 0.000335811 | -1.78E-04 | -2.59E-05 | -2.78E-04 | 2.26E-04 | 7.63E-05 | 0.0001495 | 0 | 0.000384906 |
| FLIGHT 5 | 0.00449663 | 0.00523896 | 0.0032431 | 0.0072326 | 0.000213623 | 0.000130463 | 0 | 0.000335811 | 5.09E-06 | -2.59E-05 | -2.78E-04 | 2.26E-04 | 1.22E-04 | 0.0001495 | 0 | 0.000384906 |
| FLIGHT 6 | 0.004479672 | 0.00523896 | 0.0032431 | 0.0072326 | 0.000228882 | 0.000130463 | 0 | 0.000335811 | 4.58E-05 | -2.59E-05 | -2.78E-04 | 2.26E-04 | 1.37E-04 | 0.0001495 | 0 | 0.000384906 |
| FLIGHT 7 | 0.00422197 | 0.00523896 | 0.0032431 | 0.0072326 | 0.000320435 | 0.000130463 | 0 | 0.000335811 | -6.61E-05 | -2.59E-05 | -2.78E-04 | 2.26E-04 | 1.07E-04 | 0.0001495 | 0 | 0.000384906 |
| FLIGHT 8 | 0.004411008 | 0.00523896 | 0.0032431 | 0.0072326 | 7.62939E-05 | 0.000130463 | 0 | 0.000335811 | -1.12E-04 | -2.59E-05 | -2.78E-04 | 2.26E-04 | 2.29E-04 | 0.0001495 | 0 | 0.000384906 |
| FLIGHT 9 | 0.00507138 | 0.00523896 | 0.0032431 | 0.0072326 | 6.1035E-05 | 0.000130463 | 0 | 0.000335811 | -4.07E-05 | -2.59E-05 | -2.78E-04 | 2.26E-04 | 1.98E-04 | 0.0001495 | 0 | 0.000384906 |
| FLIGHT 10 | 0.00506629 | 0.00523896 | 0.0032431 | 0.0072326 | 0.000137329 | 0.000130463 | 0 | 0.000335811 | -1.65E-04 | -2.59E-05 | -2.78E-04 | 2.26E-04 | 1.53E-04 | 0.0001495 | 0 | 0.000384906 |
| FLIGHT 11 | 0.00570297 | 0.00523896 | 0.0032431 | 0.0072326 | 0.00012207 | 0.000130463 | 0 | 0.000335811 | 1.53E-04 | -2.59E-05 | -2.78E-04 | 2.26E-04 | 4.58E-05 | 0.0001495 | 0 | 0.000384906 |
| FLIGHT 12 | 0.004484339 | 0.00523896 | 0.0032431 | 0.0072326 | 9.1527E-05 | 0.000130463 | 0 | 0.000335811 | 8.65E-05 | -2.59E-05 | -2.78E-04 | 2.26E-04 | 1.68E-04 | 0.0001495 | 0 | 0.000384906 |
| FLIGHT 13 | 0.00540288 | 0.00523896 | 0.0032431 | 0.0072326 | 0.000152588 | 0.000130463 | 0 | 0.000335811 | -5.59E-05 | -2.59E-05 | -2.78E-04 | 2.26E-04 | 1.68E-04 | 0.0001495 | 0 | 0.000384906 |
| FLIGHT 14 | 0.00650461 | 0.00523896 | 0.0032431 | 0.0072326 | 7.62939E-05 | 0.000130463 | 0 | 0.000335811 | 5.09E-06 | -2.59E-05 | -2.78E-04 | 2.26E-04 | 9.16E-05 | 0.0001495 | 0 | 0.000384906 |
| FLIGHT 15 | 0.0057284 | 0.00523896 | 0.0032431 | 0.0072326 | 3.0517E-05 | 0.000130463 | 0 | 0.000335811 | 1.02E-05 | -2.59E-05 | -2.78E-04 | 2.26E-04 | 7.63E-05 | 0.0001495 | 0 | 0.000384906 |
| FLIGHT 16 | 0.00618108 | 0.00523896 | 0.0032431 | 0.0072326 | 0.000259399 | 0.000130463 | 0 | 0.000335811 | -3.56E-05 | -2.59E-05 | -2.78E-04 | 2.26E-04 | 1.83E-04 | 0.0001495 | 0 | 0.000384906 |
| FLIGHT 17 | 0.00514857 | 0.00523896 | 0.0032431 | 0.0072326 | 9.1527E-05 | 0.000130463 | 0 | 0.000335811 | -1.02E-04 | -2.59E-05 | -2.78E-04 | 2.26E-04 | 1.53E-04 | 0.0001495 | 0 | 0.000384906 |
| FLIGHT 18 | 0.00586573 | 0.00523896 | 0.0032431 | 0.0072326 | 0.000198364 | 0.000130463 | 0 | 0.000335811 | -2.03E-05 | -2.59E-05 | -2.78E-04 | 2.26E-04 | 2.59E-04 | 0.0001495 | 0 | 0.000384906 |
| FLIGHT 19 | 0.00494003 | 0.00523896 | 0.0032431 | 0.0072326 | 3.0517E-05 | 0.000130463 | 0 | 0.000335811 | -3.56E-05 | -2.59E-05 | -2.78E-04 | 2.26E-04 | 6.10E-05 | 0.0001495 | 0 | 0.000384906 |
| FLIGHT 20 | 0.00618108 | 0.00523896 | 0.0032431 | 0.0072326 | 9.1527E-05 | 0.000130463 | 0 | 0.000335811 | 1.53E-05 | -2.59E-05 | -2.78E-04 | 2.26E-04 | 1.98E-04 | 0.0001495 | 0 | 0.000384906 |
| FLIGHT 21 | 0.00754086 | 0.00523896 | 0.0032431 | 0.0072326 | 0.000213623 | 0.000130463 | 0 | 0.000335811 | -2.227E-04 | -2.59E-05 | -2.78E-04 | 2.26E-04 | 3.61E-04 | 0.0001495 | 0 | 0.000384906 |
| FLIGHT 22 | 0.0085088 | 0.00523896 | 0.0032431 | 0.0072326 | 0.000106812 | 0.000130463 | 0 | 0.000335811 | 2.08E-04 | -2.59E-05 | -2.78E-04 | 2.26E-04 | 5.78E-04 | 0.0001495 | 0 | 0.000384906 |
| FLIGHT 23 | 0.00696612 | 0.00523896 | 0.0032431 | 0.0072326 | 6.1035E-05 | 0.000130463 | 0 | 0.000335811 | -3.11E-04 | -2.59E-05 | -2.78E-04 | 2.26E-04 | 4.76E-04 | 0.0001495 | 0 | 0.000384906 |
| FLIGHT 24 | 0.006699663 | 0.00523896 | 0.0032431 | 0.0072326 | 0.000213623 | 0.000130463 | 0 | 0.000335811 | 8.82E-05 | -2.59E-05 | -2.78E-04 | 2.26E-04 | 3.71E-04 | 0.0001495 | 0 | 0.000384906 |
| FLIGHT 25 | 0.00729672 | 0.00523896 | 0.0032431 | 0.0072326 | 0.000228882 | 0.000130463 | 0 | 0.000335811 | 1.46E-04 | -2.59E-05 | -2.78E-04 | 2.26E-04 | 4.37E-04 | 0.0001495 | 0 | 0.000384906 |

FIG. 10

DETECTION OF NOISE IN PRESSURE SENSOR AND PREDICTION OF PRESSURE SENSORS DRIFT IN CABIN PRESSURE CONTROL SYSTEM/AIR DATA COMPUTER SYSTEM/ENVIRONMENTAL CONTROL SYSTEMS

BACKGROUND OF THE INVENTION

The present invention generally relates to pressure sensors and, more particularly, to apparatus and methods for maintaining the proper operation of pressure sensors.

Pressure sensors can drift and degrade signal quality over time (output noise), resulting in pressure control inaccuracy and degraded pressure control stability.

Control inaccuracy can result in overlaps between control and monitoring functions, resulting in erroneous BIT failures and user indications. Or, control inaccuracy can result in overlap with environmental pressure safety valve functionality, resulting in environmental pressure oscillations.

Degraded pressure control stability can result in occupant discomfort and possibly minor injury.

However, a negative trend for these qualitative pressure sensor attributes (drift and noise) may be indicative of imminent complete functional failure of the pressure sensor.

As can be seen, there is a need for improved apparatus and methods to maintain the proper operation of pressure sensors.

SUMMARY OF THE INVENTION

In one aspect of the present invention, a pressure control system for an environment to be pressurized comprises a controller configured to calculate at least one of: a calculated pressure sensor rate of change error; and a calculated pressure sensor error; wherein the calculated sensor rate of change error is based on a plurality of first environment air pressure signals over a first time period; wherein the calculated sensor error is based, over a second period of time, a difference between ambient air pressure signals and second environment air pressure signals; and a processor in communication with the controller and configured to compare at least one of: the calculated pressure sensor rate of change error with at least one pressure sensor rate of change error control limit; the calculated pressure sensor error with at least one pressure sensor error control limit; wherein the at least one pressure sensor rate of change error control limit is based on past pressure sensor rate of change errors; wherein the at least one pressure sensor error control limit is based on past pressure sensor errors.

In another aspect of the present invention, a pressure control system for an environment, within an enclosure, to be pressurized, comprises an environmental pressure sensor; an ambient air pressure sensor; a controller in communication with the environmental and ambient air pressure sensors and configured to calculate: a calculated pressure sensor rate of change error; and a calculated pressure sensor error; wherein the calculated pressure sensor rate of change error is based on a plurality of rate environment air pressure signals; wherein the calculated pressure sensor error is based on a plurality of pressure differentials between ambient air pressure signals and environment air pressure signals; a database of: an upper pressure sensor rate of change error control limit for the environmental sensor; a lower pressure sensor rate of change error control limit for the environmental sensor; an upper pressure sensor error control limit for the environmental sensor; a lower pressure sensor error control limit for the environmental sensor; a processor in communication with the database and the controller, wherein the processor is configured to: compare the calculated pressure sensor rate of change error with at least one of the upper and lower pressure sensor rate of change error control limits; compare the calculated pressure sensor error with at least one of the upper and lower sensor error control limits; predict when the environmental sensor should be repaired or replaced.

In a further aspect of the present invention, a non-transitory computer readable medium with computer executable instructions stored thereon, executed by a processor, to perform a method for controlling pressure in an environment within an enclosure, the method comprises sampling ambient air pressure outside of the enclosure; sampling environment air pressure inside of the environment; based on one or both of the sampled ambient air pressure and sampled environment air pressure, calculating at least one of a calculated pressure sensor error and a calculated pressure sensor rate of change error; repetitively calculating, by a processor, at least one of a pressure sensor error control limit and a pressure sensor rate of change error control limit; comparing, by the processor, at least one of: the calculated pressure sensor error with the pressure sensor error control limit; and the calculated pressure sensor rate of change error with the pressure sensor rate of change error control limit; and predicting a failure of a pressure sensor in communication with the environment.

These and other features, aspects and advantages of the present invention will become better understood with reference to the following drawings, description and claims.

BRIEF DESCRIPTION OF THE DRAWINGS

FIG. 3 is a database of sampled pressures in a pressure control system according to an embodiment of the present invention;

FIG. 4 is a database of control limits in a pressure control system according to an embodiment of the present invention;

FIG. 6 is a dispersion chart in a pressure control system according to an embodiment of the present invention;

FIG. 10 is a continuing database of control limits in a pressure control system according to an embodiment of the present invention.

DETAILED DESCRIPTION OF THE INVENTION

Figure 1:
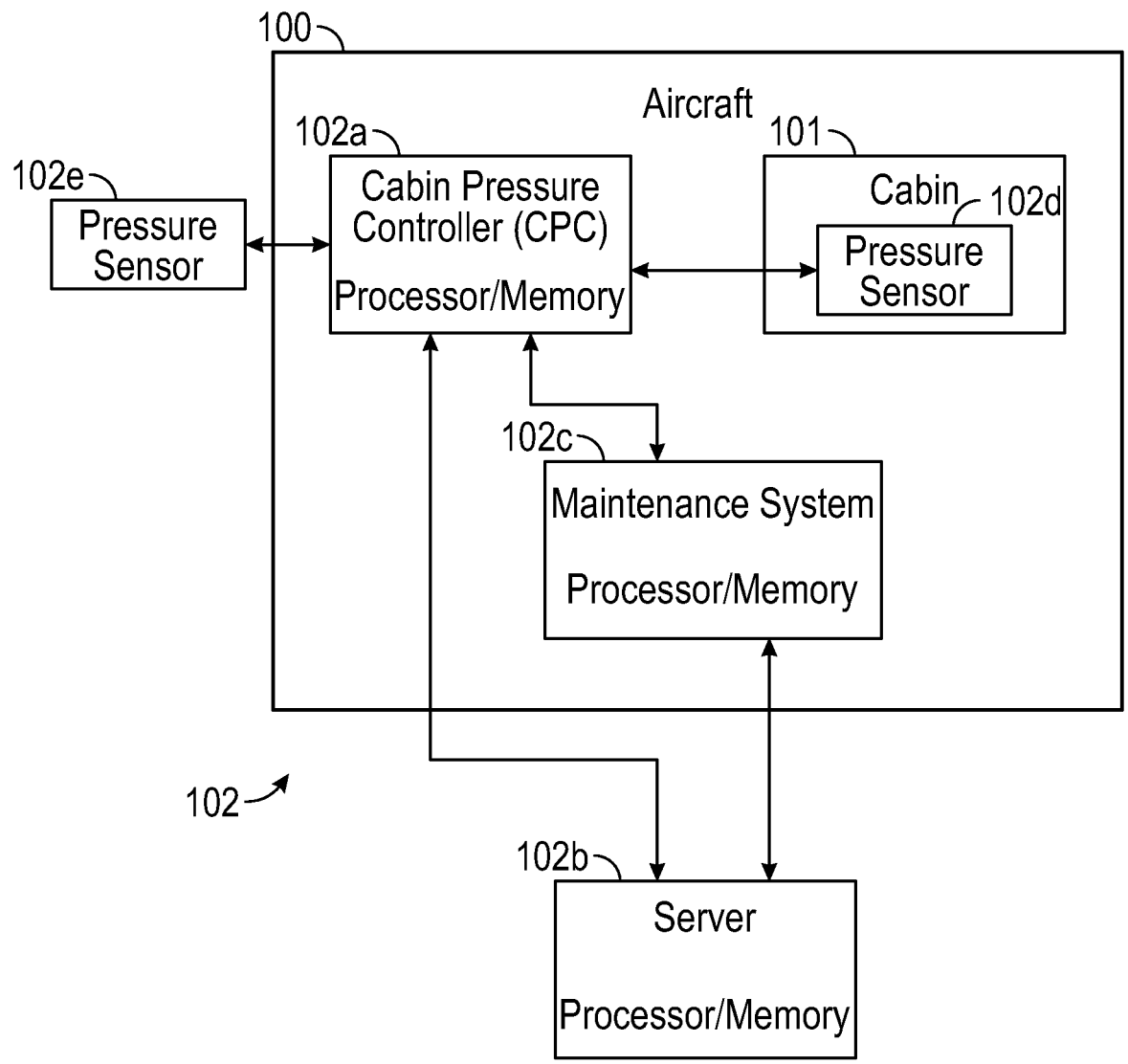
FIG. 1 is block diagram of an aircraft with a pressure control system according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides apparatus and methods to analyze pressure sensor drifting, analyze presence of noise in the pressure sensor, and provide predictive maintenance requirements for the pressure sensor to avoid potentially catastrophic events in the environment for which the pressure sensor is used. For example, this invention can analyze and identify a degrading pressure sensor prior to a critical failure event—such as loss of environmental pressure auto control, depressurization, or over pressurization which may be of an aircraft cabin for example.

This invention uses environmental pressure controller embedded software to communicate pressure sensor readings to a standalone server/system, such as wirelessly. For example, in the context of an aircraft, the server/system is not in the aircraft but on the ground. Accordingly, in the context of aircraft, main computations are performed by ground based computational resources, which are not as resource limited, more easily improved, and more accessible than embedded software in an environmental pressure controller (hardware) inside of the aircraft. This reduces software requirements for the environmental pressure controller.

Since the prediction algorithms of the present invention run outside of the controller, if a change is necessary to improve the prediction algorithms, there is no need to recertify the code, such as in the case of aircraft. Also, there would be no impact on the environmental pressure controller software throughput. This means that the embedded controller software has little impact to implement this solution and the impact to aircraft certification is negligible.

According to the invention, as the database in the standalone server/system gets populated with new data (drift and noise) being collected from various controllers over a period of time, the predictions can be improved and made more accurate. This gives a good understanding into how the pressure sensors are performing in the field and provide opportunity to improve the pressure sensors.

This invention provides a way to detect the pressure sensor drifts and noise from any pressure sensor connected to the cabin pressure control systems/air data systems/environmental control systems. It would be able to predict when the pressure sensor drifting will exceed (not just has already exceeded) the threshold limits which, if not detected, would eventually fault the pressure sensor and thus the system. This will also predict if there is a noise that exists in the pressure sensors.

To predict that the sensor might be drifting away from threshold, the invention makes use of extracting the pressure sensor error, using three (or more) consecutive computations of the measured pressure subtracted from the ambient pressure, and the part number and serial number of the controller from the system after every landing to ground, in the case of aircraft, transition over wireless to a standalone system/server. The triggering event to cause the consecutive measurements would be that the airplane is on the ground and the main cabin doors are open, such that the measured cabin pressure would theoretically be equal to the ambient pressure. The ambient pressure is measured by an ambient pressure sensor which, due to its importance in aircraft control, is calibrated on-aircraft more frequently than the subject cabin pressure sensor. Thus, if there is a difference between the ambient pressure sensor and the cabin pressure sensor, the cabin pressure sensor is considered to be the sensor with the error.

Since unit has associated part numbers and serial numbers, a database is dynamically created with pressure sensor errors for a sensor associated with a unit. A similar database is created for each unit existing in the field during their life span and all the databases are merged into a standalone server/system. As the database with the pressure sensor errors are built, using a statistical control chart to determine if any of the offsets fall beyond the threshold limits can raise an advisory to user of the controller.

By capturing at least three consecutively acquired sets of data for cabin rates of change while the aircraft is on ground and doors are open, information can be sent across wirelessly to the standalone system/server. If the airplane is on ground and doors are open, ideally the system should not detect any significant rate. Therefore, in theory, the rate of change "error" would be the measured rate as compared (subtracted) from "zero" rate.

Although the present invention can be implemented in the context of aircraft, the present invention contemplates other implementations, such as land-based vehicles and other enclosed environments for occupancy by humans.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable media having computer readable program code embodied thereon.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram of an enclosure 100 with a pressure control system 102 according to an environment of the present invention. As an example, the enclosure 100 may be an aircraft or other vehicle. The enclosure 100 may include therein an environment 101 to be pressurized for human occupants. As an example, the environment 101 may be a cabin of an aircraft.

In embodiments, the pressure control system 102 can be configured to predict failure of the system 102 and thus better ensure appropriate pressurization of the environment. In embodiments, the system 102 may include a cabin pressure controller (CPC) 102a, a server 102b, a maintenance system 102c, an environment pressure sensor 102d, and an ambient pressure sensor 102e.

According to embodiments, controller 102a may be implemented in software and/or hardware and include a processor and memory. The controller 102a may be in communication with one or more of the server 102b, the maintenance system 102c, the environment pressure sensor 102d, and the ambient pressure sensor 102e. The controller 102a may be located inside of the environment 100.

The maintenance system 102c may be a software and/or hardware system with a processor and memory, in embodiments. The maintenance system 102c may generally monitor the health of the enclosure 100. It may be located inside of the enclosure 100.

On the other hand, in embodiments, the computer server 102b with a processor and memory may be located outside of and not affixed to the enclosure 100. For example, the server 102b may be located on the ground and accessible to maintenance personnel outside of the enclosure 100. In embodiments, the server 102b may take the place of and thus perform the functions of the maintenance system 102c.

In embodiments, the environment pressure sensor 102d may be inside of the enclosure 100, such as inside of the environment 101. The environment pressure sensor 102d can be configured to continuously sample and monitor air pressure inside the environment 101. The pressure sensor 102d may be further configured to send, over a first period of time, a plurality of first environment air pressure signals to the controller 102a. Additionally, the pressure sensor 102d may be configured to send, over a second period of time, a plurality of second environment air pressure signals to the controller 102a.

In embodiments, the first and/or second environment air pressure signals may be rate of change error environment air pressure signals and/or error environment air pressure signals. The rate of change error environment air pressure signals can be the same or different from the error environment air pressure signals. In embodiments, the first time period may be the same or different from the second time period.

In embodiments, the ambient pressure sensor 102e may be outside of the enclosure 100, such as being affixed to an exterior wall of the enclosure 100. The ambient pressure sensor 102e can be configured to continuously and/or periodically sample or monitor ambient air pressure outside of the environment 101 (i.e., atmospheric pressure). The pressure sensor 102e may be further configured to send, over a second period of time, a plurality of ambient air pressure signals to the controller 102a.

In embodiments, the ambient air pressure signals may be ambient air pressure signals. In embodiments, the second time period of sending the ambient air pressure signals to the controller may be the same or different from the second time period of sending the environment air pressure signals to the controller.

According to embodiments, the first time period over which the environment pressure sensor 102d samples interior pressure may be the same or different from the second time period over which the ambient pressure sensor 102e samples exterior or ambient pressure.

Figure 2A:
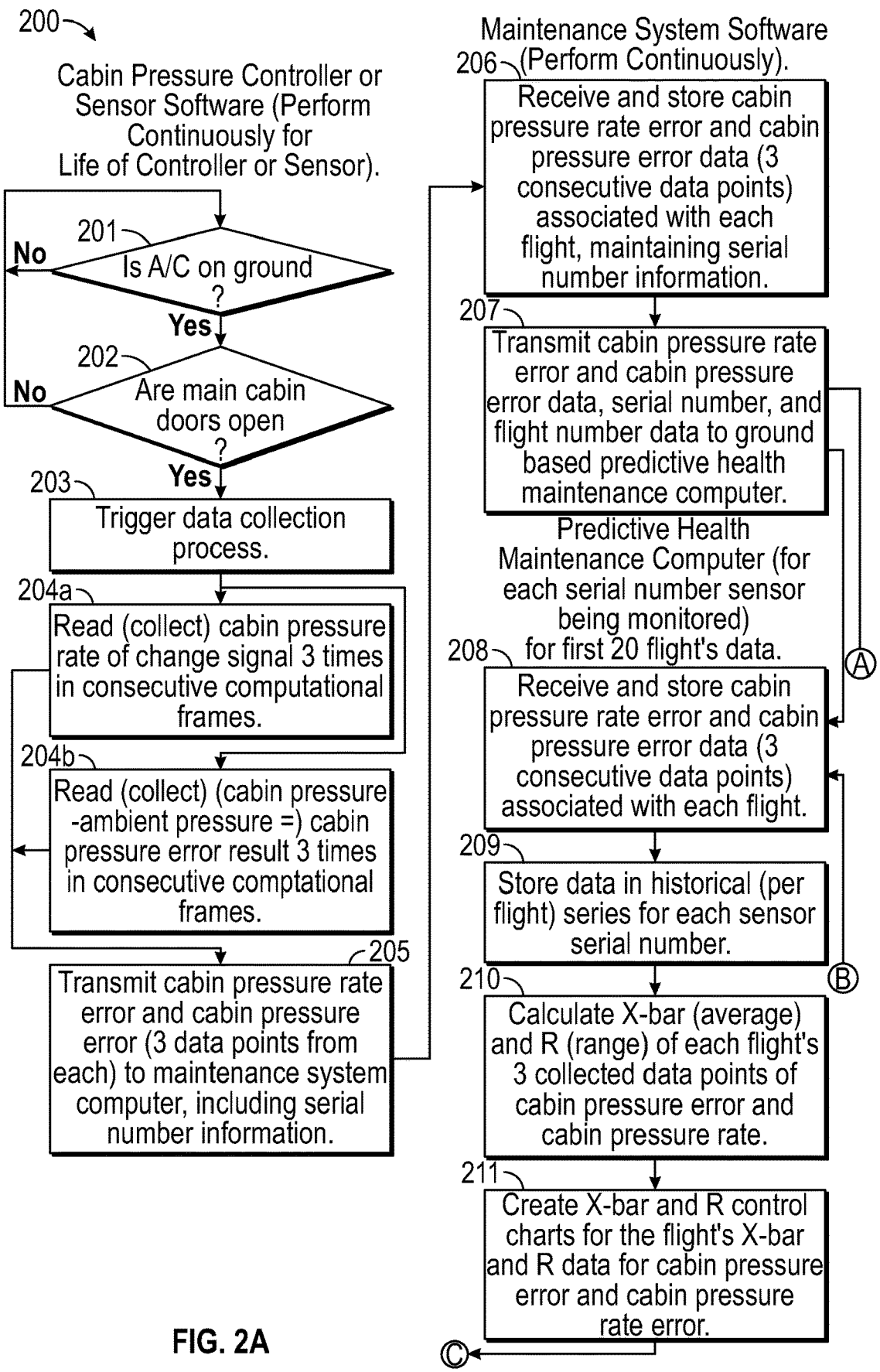
FIGS. 2A-2B are flow charts of a method of controlling pressure according to an embodiment of the present invention.
Figure 2B:
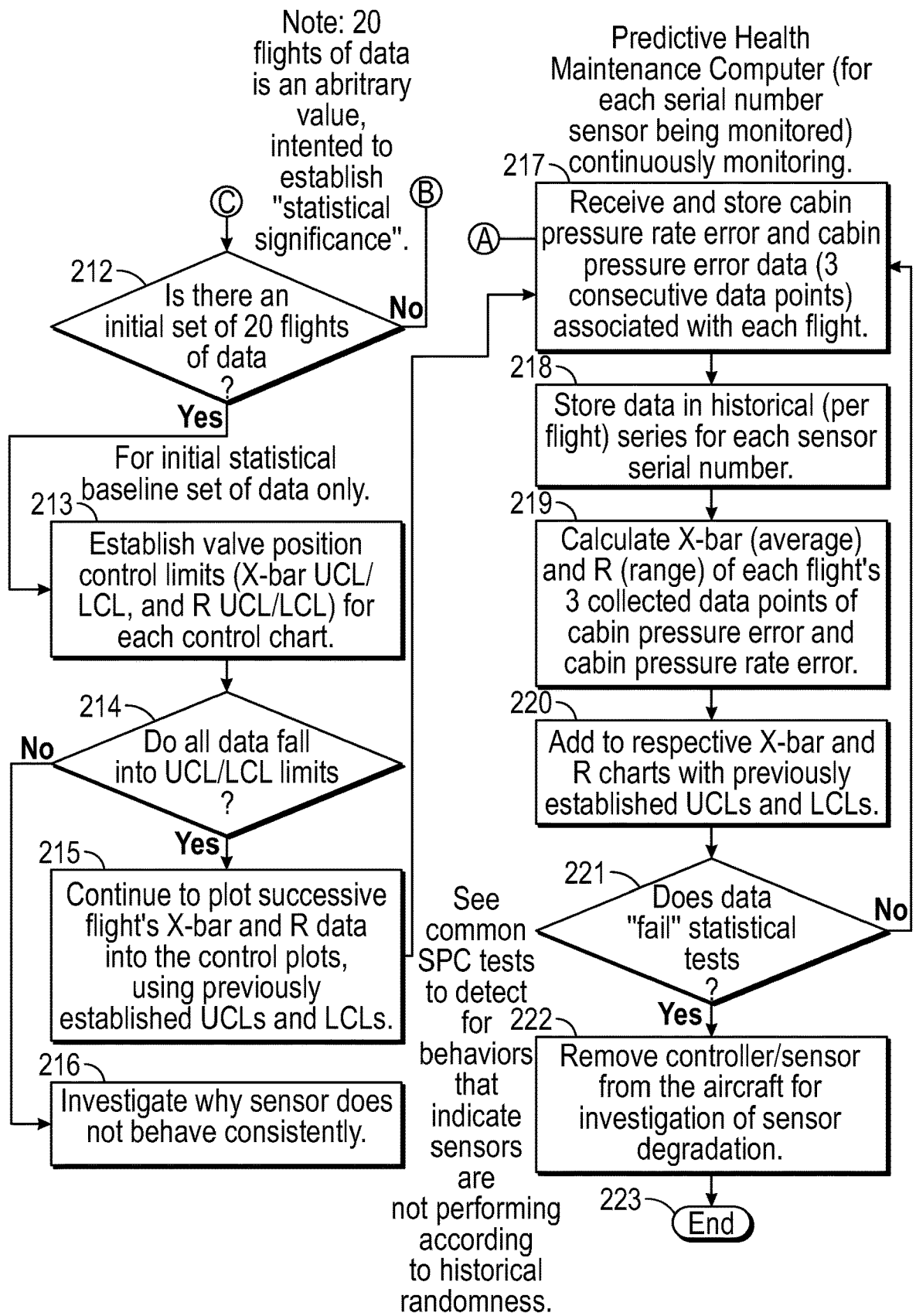

FIGS. 2A-2B are flow charts of a method 200 of controlling pressure according to an embodiment of the present invention. The method 200 can employ the pressure control system 102 of FIG. 1, as an example. Generally, and as further described below, the method 200 may include consecutively sampling, during a first time period, environment air pressure inside of an environment; and consecutively sampling, during the first time period, ambient air pressure outside of the environment.

The method 200 may continue by using the sampled environment air pressure, a calculated pressure sensor rate of change error is calculated for an environmental pressure sensor in communication with the environment. Using the sampled environment air pressure and the sampled ambient air pressure, a calculated pressure sensor error is calculated for the environmental pressure sensor. However, the present invention contemplates that only one of the calculated pressure sensor rate of change error and the calculated pressure sensor error can be calculated.

In embodiments of the method 200, the calculated sensor rate of change error and the calculated sensor error can be computed by the same or different computer processor. However, in some embodiments, the calculations are performed by a processor outside of the environment, like the server 102b, in order to minimize the resources needed in the environment. The calculated sensor rate of change error and/or the calculated sensor error may then be stored in a database, such as one outside of the environment like the server 102b.

The method 200 may generally continue by comparing one or both of the calculated pressure sensor rate of change error and the calculated pressure sensor error to one or more respective control limits. In embodiments, one or more of the control limits is a statistical control limit. In embodiments, one or more of the statistical control units are calculated using past calculated pressure sensor rate of change errors and/or past calculated pressure sensor errors. In embodiments, the control limits are respective lower and upper control limits for the calculated pressure sensor rate of change errors and for the calculated pressure sensor error.

Using the foregoing comparisons to control limits, the method 200 may then predict and advise a user that the environmental pressure sensor is or is not expected to fail and/or should be repaired or replaced.

More specific details of the method 200, according to an exemplary embodiment, will now be described.

In a step 201, determine if the environment (such as an aircraft) is on the ground. If "no", then step 201 repeats. If "yes", then go to a step 202.

At step 202, determine if the environment is open to ambient air pressure (e.g., are the cabin doors open). If "no", the step 201 repeats. If "yes", then go to step 203.

At step 203, determine that there is a triggering event to start data collection. For example, the event could be that the aircraft is on the ground and the cabin doors are open. The method 200 may then proceed to a step 204a and/or a step 204b. If to both, step 204a and step 204b may occur at the same time or at different times.

In step 204a, use an environmental pressure sensor in communication with the environment, and sample/collect environment air pressure over a first time period, and a plurality of first environment air pressure signals (or rate of change error environment air pressure signals) can be sent to a controller, such as controller 102a. As an example, three environment air pressure signals that are consecutive in the first time period may be sent. The controller may then calculate three calculated pressure sensor rate of change errors, if any, during the first time period, sensed by the environmental pressure sensor.

In step 204b, use the environmental pressure sensor, and sample/collect environment air pressure over a second time period, and a plurality of second environment air pressure signals (or error environment pressure signals) can be sent to a controller, such as controller 102a. As an example, three environment air pressure signals that are consecutive in the second time period may be sent. As noted above, the first time period for the first rate of change error environment air pressure signals may the same or different, in point of time and/or duration, as the second time period for the second environment air pressure signals.

Also in step 204b, use an ambient pressure sensor in communication with the ambient outside atmosphere, and sample/collect ambient air pressure over a second time period, and a plurality of ambient air pressure signals (or ambient air pressure signals) can be sent to a controller, such as controller 102a. As an example, three ambient air pressure signals that are consecutive in time may be sent. The second time period for the ambient air pressure signals may the same, in point of time and/or duration, as the second time period for the second environment air pressure signals. The second time period for the ambient air pressure signals may also be the same or different, in point of time and/or duration, as the first time period for the first rate of change error environment air pressure signals.

Further in step 204b, calculate a plurality of pressure differentials or errors, for example by the controller 102a, based on the arithmetic difference between the error environment air pressure signals and the error ambient air pressure signals. As an example, three pressure or error differentials that are consecutive in time may be calculated to provide three calculated pressure sensor errors.

In step 204a and/or step 204b, the environmental pressure sensor may also send to the controller a unique identifier, such as a serial number, of the environmental pressure sensor. Alternatively, the controller itself may have a unique identifier.

Although the above describes, for purposes of example, a single environmental air pressure sensor and a single ambient air pressure sensor, it can be appreciated that multiple sensors of one or both types can be employed.

In a step 205, send the calculated pressure sensor rate of change errors from step 204a and the calculated pressure sensor errors from step 204b to a database, such as the maintenance system 102c or the server 102b. At the same time, the unique identifier of the environmental pressure sensor may also be sent from the controller to the database.

In a step 206, store the calculated pressure sensor rate of change errors, the calculated pressure sensor errors, and environmental pressure sensor serial number in the database.

As can be appreciated, steps 201 through 206 can be repeated for each travel of the environment, such as each flight of a particular aircraft.

In a step 207, send the calculated sensor rate of change errors, the calculated sensor errors, associated trip/flight number, and sensor serial number to another database/computer, such as the server 102b.

In a step 208, store the data from step 207 which may only be the most recent data associated with a given number of recent flights. For example, data from only the last twenty flights may be stored.

In a step 209, store the data from step 208 chronologically by each travel/flight.

In a step 210, calculate an average (mean, "X-bar") of the calculated sensor rate of change errors (for example, three) from step 208 and an average (mean) of the calculated sensor errors (for example, three) from step 208 for each trip/flight. Likewise, calculate a range ("R") for the calculated sensor rate of change errors (for example, three) from step 208 over the total number of travels/flights from step 208. The calculations may be performed by the server 102b.

In a step 211, based the averages and the ranges from step 210, create control charts (e.g., X-bar charts and R charts, respectively) for the calculated sensor errors and the calculated sensor rate of change errors.

In a step 212, determine whether there is data from a minimum number of trips/flights (e.g., twenty) to establish statistical significance. If "yes", then go to step 213. If "no", then return to step 208.

In step 213, calculate an average (mean) of the mean for each trip/flight over the total number of travels/flights from step 208 and then establish upper and lower control limits from the control charts for the average (X-bar chart) and for the range (R chart).

In a step 214, determine whether the sampled environmental pressure from step 204a, 204b fall within the control limits. If "yes", the step 215. If "no", then step 216.

In step 216, the method 200 predicts a potential failure of the environmental pressure sensor 102d and/or advises a user that the environmental pressure sensor should be repaired or replaced.

In step 215, continue to plot into control charts of successive trip/flight data of average and range for calculated sensor rate of change errors and calculated sensor errors.

After step 215, in a step 217, while using the server 102b, receive and store calculated sensor rate of change errors and calculated sensor errors for continuing trips/flights.

In a step 218, the data from step 217 with the sensor serial number is stored for continuing trips/flights.

In a step 219, an average (mean, "X-bar") of the calculated sensor rate of change errors (for example, three) from step 217 and an average (mean) of the calculated sensor errors (for example, three) from step 217 can be calculated for each trip/flight. Likewise, a range ("R") for the calculated sensor rate of change errors (for example, three) from step 217 can be calculated over the total number of travels/flights from step 217. The calculations may be performed by the server 102b.

In a step 220, data from step 219 is used to update the control charts.

In a step 221, determine if the sample environmental air pressure falls outside of the control limits in the control charts. If "no", the return to step 217. If "yes", then go to step 222.

In step 222, remove the controller and/or environmental pressure sensor for investigation of potential failure.

In step 223, the method 200 ends.

EXAMPLE

Twenty (20) flights of sample data were taken to demonstrate the collection of "normal" cabin pressure error and cabin pressure rate of change error.

X-bar and R charts were created to understand the normality using Statistical Process Control techniques. This plotted data included upper control limits (UCL) and lower control limits (LCL) to show graphically how the plus/minus 3-standard deviations of the normal data would remain, if unaffected.

The UCL and LCL only describe the actual data. They are not representative of the sensor performance requirements—and, in fact, are expected to be within the performance requirements (if the design of the sensor has this capability).

Five (5) additional flights are shown where a special cause effect to the pressure sensor is simulated. This causes the data to "fail" the control chart expectation, possibly indicating that, soon, the pressure sensor will result in an out of tolerance condition that might result in a failed component.

Technique Description

FIG. 3 is a database (i.e., excel spreadsheet, only one flight of data shown) of 20 flights of data. These first 20 worksheets represent "normal" operating cabin pressure sensor performance, and are used to define "normal" operating performance in the baseline control charts. Additionally, worksheets (not shown) named "Flight 2 (2), Flight 3 (2), Flight 4 (2), Flight 5 (2), and Flight 6 (2)" represent data captured for flights 21 through 25.

Data Computed and Transmitted from the Cabin Pressure Controller

Data representing the Ambient Pressure and Cabin (Environment) Pressure (FIG. 3, columns A and B) are obtained from the cabin pressure controller (CPC) in the cabin pressure control system (CPCS) on the airplane. Three consecutive data points (i.e., first three rows) are taken at an interval of approximately 0.050-seconds apart. This data is only obtained when the main cabin doors are known to be open.

Likewise, data representing the Environment Pressure Rate of Change (FIG. 3, column E) is obtained from the CPC on the airplane. Note, "rate of change error" is assumed here, because the expected rate is "zero." Again, three consecutive data points (i.e., first three rows) are taken at an interval of approximately 0.050-seconds apart.

Along with the CPC serial number—or other technique to identify the specific pressure sensor serial numbered item that is being monitored—this data is transmitted from the CPC to another system on the airplane that collects maintenance information. That maintenance system then transmits this raw information off of the airplane to a ground based system that utilizes provides health monitoring and/or warning.

Alternatively, the CPC could have the ability to wirelessly transmit this data directly to a ground based system (without using an onboard maintenance computer).

Ground-Based Predictive Health Monitoring System

As shown in FIG. 3, the cabin pressure "error" is computed by subtracting the Ambient Pressure from the Cabin (Environment) Pressure for each of the three transmitted samples ("Pressure Error (Pc−Pa)" as shown in column D). This "error" assumes that the Ambient Pressure comes from a more accurate source than the Cabin (Environment) Pressure source—an assumption used because the Ambient Pressure is obtained from an air data computer, which much be recalibrated periodically to meet airplane certification requirements.

When the doors are open, the cabin pressure equals the ambient pressure (in theory), so the two values should be very close to each other in magnitude—with only calibration and noise errors causing a difference.

The Environment Pressure Rate of Change Error data (FIG. 3, column E) is the result of a cabin pressure rate of change error calculation in the CPC, using the pressure sensor Cabin (Environment) Pressure as an input.

When the doors are open, the cabin pressure rate of change should be theoretically "zero" (no rate), unless there is wind or some other external influence that causes a pressure disturbance. However, if consecutive samples (e.g., three) are showing differences, this is most likely due to circuitry/sensor electrical noise as amplified through the gains necessary to perform this calculation.

Control charts will utilize the three consecutive "samples" of "Pressure Error (Pc-Pa)" and "Environment Pressure Rate of Change Error" as described in the next section.

Baseline Control Chart Computations

Column F from FIG. 3 are not used in any of the following description.

For each flight's data, for 20 flights, X-bar and R control charts, with control limits, can be computed. X-bar and R charts are well known and, for example, can be described in DeVor, Chang, Sutherland, "Statistical Quality Design and Control Contemporary Concepts and Methods", Macmillan, 1992, Chapters 5 and 6 which are incorporated herein by reference.

Figure 5A:
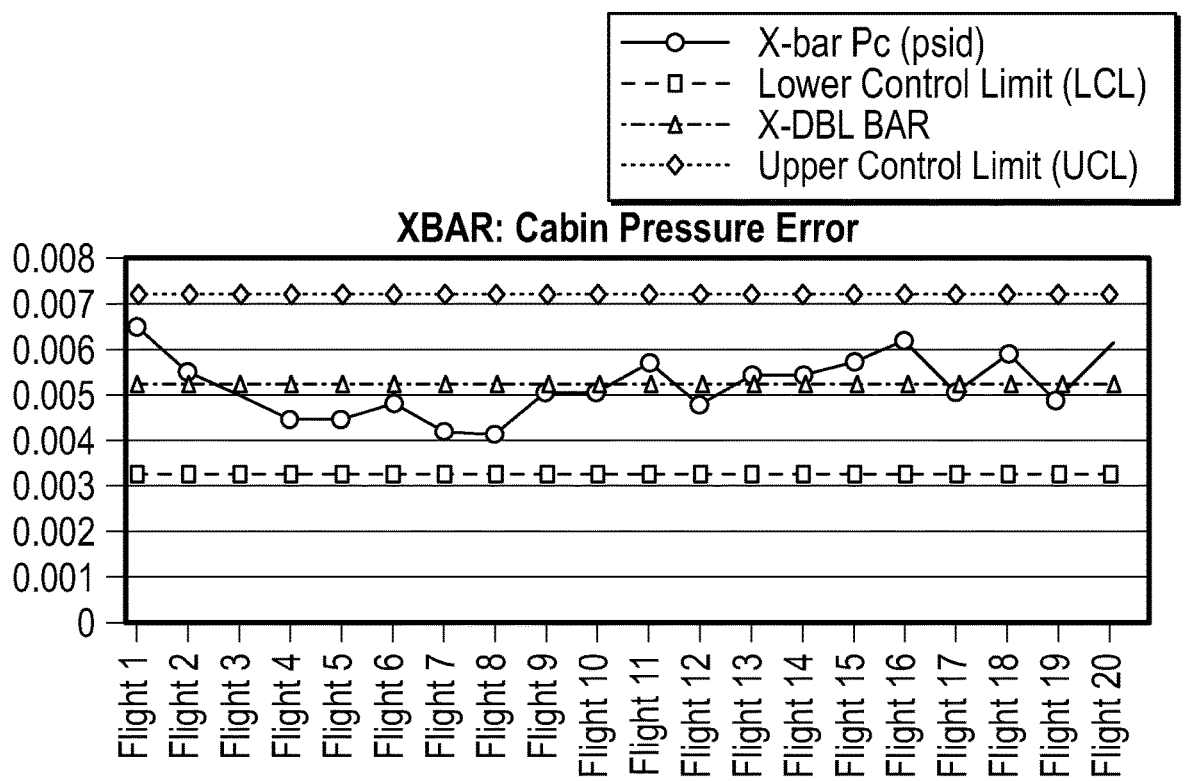
FIGS. 5A-5B are X-bar and R charts of current pressure error according to an embodiment of the present invention.
Figure 5B:
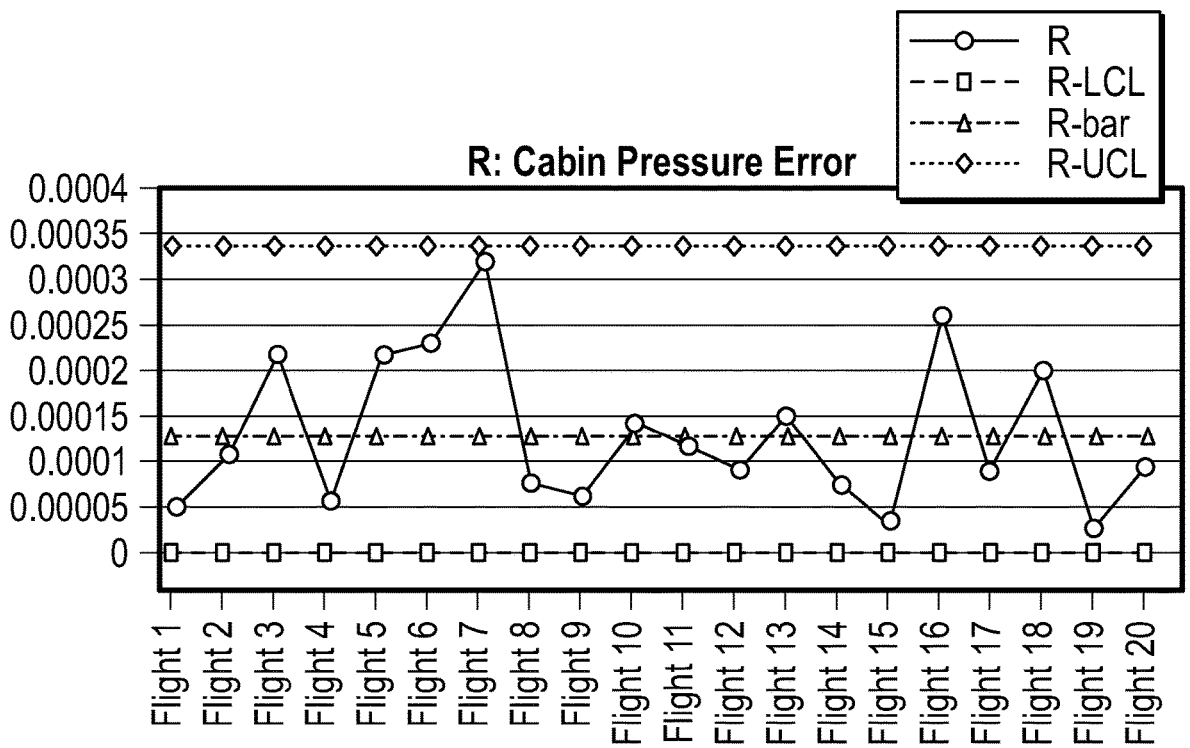

FIGS. 4, 5A and 5B show the 20 flights of data for Cabin Pressure Error and Cabin Pressure Rate Error, including the X-Bar and R results and the respective UCL and LCL for each.

Cabin Pressure Error—X-Bar Chart

The X-bar chart for Cabin Pressure Error is computed as follows:

The actual Cabin Pressure Error "X-bar" data (X-bar is the mean: $\bar{x}$)

This is the mean of the three consecutively samples Cabin Pressure Errors from each of the 20 flights:

$$X\text{-bar}_{flightn}=[(Pc-Pa)_{sample1}-(Pc-Pa)_{sample2}-(Pc-Pa)_{sample3}]/3$$

$$X\text{-bar}_{flight1}=0.00650152 \text{ (FIG. 4, column }B)$$

The Cabin Pressure Error "X-DBL BAR" ($\bar{\bar{x}}$) is computed from the X-bar (mean) data from each of the 20 flights.

$$X\text{-DBL BAR}=[X\text{-bar}_{flight1}+X\text{-bar}_{flight2}+X\text{-bar}_{flight3}+\ldots+X\text{-bar}_{flight20}]/20=0.00523896 \text{ (FIG. 4, column }C)$$

This is the "mean of the mean" of the three consecutively sampled Cabin Pressure Errors for 20 flights.

The Cabin Pressure Error Lower Control Limit (LCL) represents the "minus three standard deviations" (−3sigma) line from the "mean of the mean" (X-DBL BAR) line.

The LCL=$X$-DBL BAR−3*Sample Standard Deviations

The UCL=$X$-DBL BAR+3*Sample Standard Deviations

The Sample Standard Deviation is per the following formula:

$$\sqrt{\frac{\sum(x-\bar{x})^2}{(n-1)}}$$

FIG. 4, Column D shows this as 0.00324531 (LCL).

FIG. 4, Column E shows this as 0.0072326 (UCL).

The Cabin Pressure Error X-Bar chart is then provided from this result as shown in FIG. 5A.

In FIG. 5A, there is x-bar data (from the average of the 3 consecutive samples collected from each flight), plotted against the centered X-DBL BAR (mean of the mean of all of the data) and UCL and LCL. This plot suggests that with a 6-sigma distribution, all Cabin Pressure Error x-bar data will fall within the UCL and LCL—unless something in the sensing process changes causing the data to change its statistical distribution (mean or standard deviation).

Cabin Pressure Error—R-Chart

The same sample data from FIG. 4 is used.

The Cabin Pressure Error—R-Chart is computed as follows:

"R" represents the "range" between the minimum and maximum values of the three consecutively sampled data from each flight.

$$R=(\text{Maximum Sample}-\text{Minimum Sample})$$

For flight 1, R=4.57764E-05. This is in FIG. 4, column F.

Cabin Pressure Error R-Bar is the sample mean of the 20 flights of "R" data.

$$R\text{-BAR}=[R_{flight1}+R_{flight2}+R_{flight3}+\ldots+R_{flight20}]/20=0.000130463 \text{ (FIG. 4, column }G)$$

The Cabin Pressure Error R-Upper Control Limit is R-Bar+3 Standard Deviations, but is computed from a simplified formula UCL=D4*R-bar using the table in FIG. 6.

For a sample size of 3, D4 is 2.574.

$$\text{UCL}=2.574*0.000130463=0.000335811 \text{ (FIG. 4, column }I).$$

Cabin Pressure Error R-Lower Control Limit is R-Bar−3 Standard Deviations, but is computed from a simplified formula LCL=D3*R-bar using the table in FIG. 6.

For a sample size of 3, D3=0.

$$\text{LCL}=0*0.000130463=0 \text{ (FIG. 4, column }H).$$

The Cabin Pressure Error X-bar and R chart is then provided from this result as shown in FIG. 5B.

In FIG. 5B, the R data is in the center—representing the "spread" or "range" between the 3 samples consecutively collected for each flight. The LCL=0, meaning that the spread between the 3 samples could theoretically be zero (all samples are the same). The UCL=0.000335811, meaning that with a 6-sigma distribution, range data will not exceed this value.

All of this assumes that the sensor acts as it has, and there is no special cause that results in the data changing its statistical distribution (mean or standard deviation).

Cabin Pressure Noise X-Bar Chart

In a similar way, the consecutively sampled Cabin Pressure Rate Error Data are plotted from the data in FIG. 4. Columns from this data are as follows:

Cabin Pressure Rate Error X-bar data is in column J

Cabin Pressure Rate Error X-DBL BAR data is in column K

Cabin Pressure Rate Error LCL data is in column L

Cabin Pressure Rate Error UCL data is in column M.

Figure 7A:
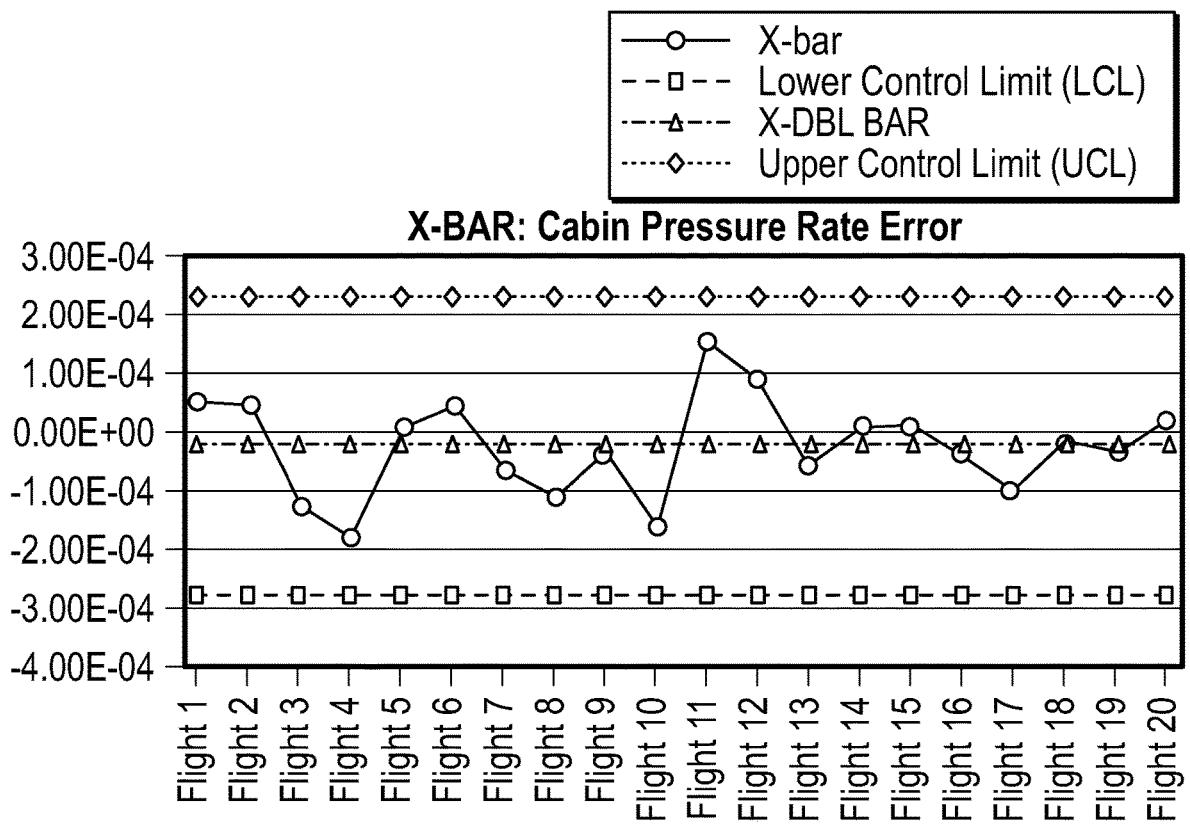
FIGS. 7A-7B are X-bar and R charts of current pressure rate error according to an embodiment of the present invention.

FIG. 7A represents the baseline Cabin Pressure Sensor Rate Error X-BAR chart from the original 20 flights.

Cabin Pressure Noise R-Chart

Columns from this data (FIG. 4) are as follows:

Cabin Pressure Rate Error R data is in column N

Cabin Pressure Rate Error R-bar data is in column O

Cabin Pressure Rate Error LCL data is in column P

Cabin Pressure Rate Error UCL data is in column Q.

Figure 7B:
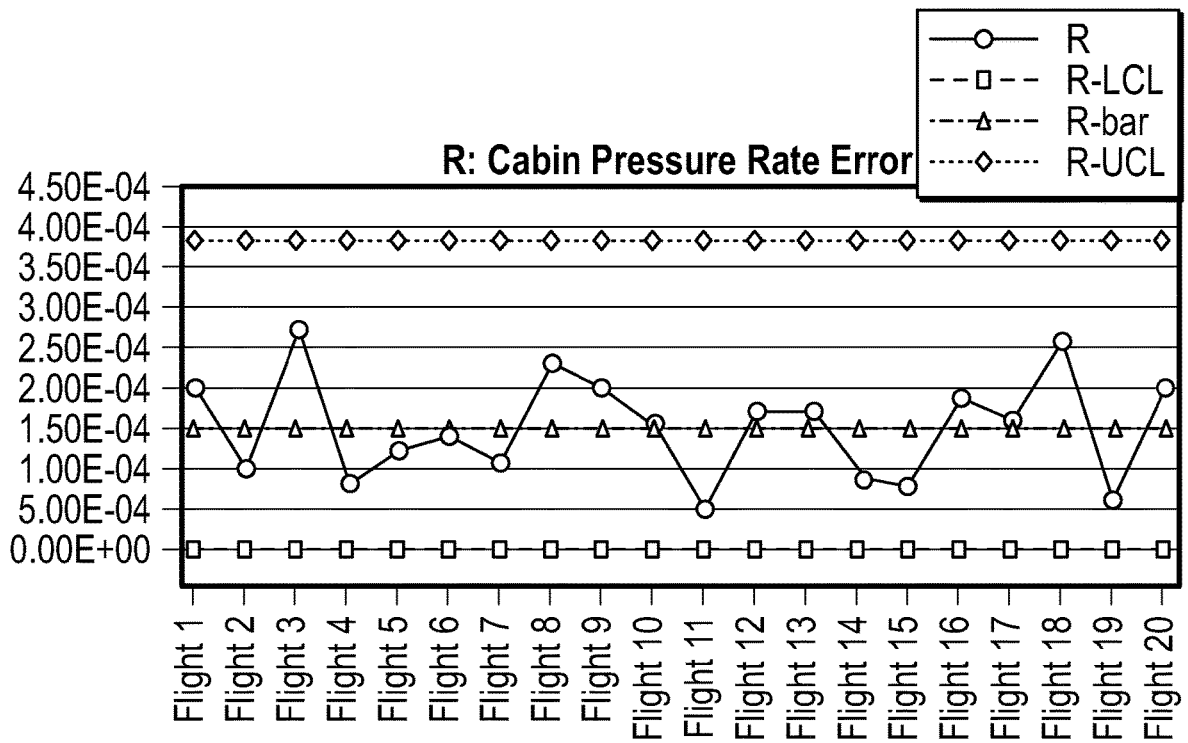
Figure 8A:
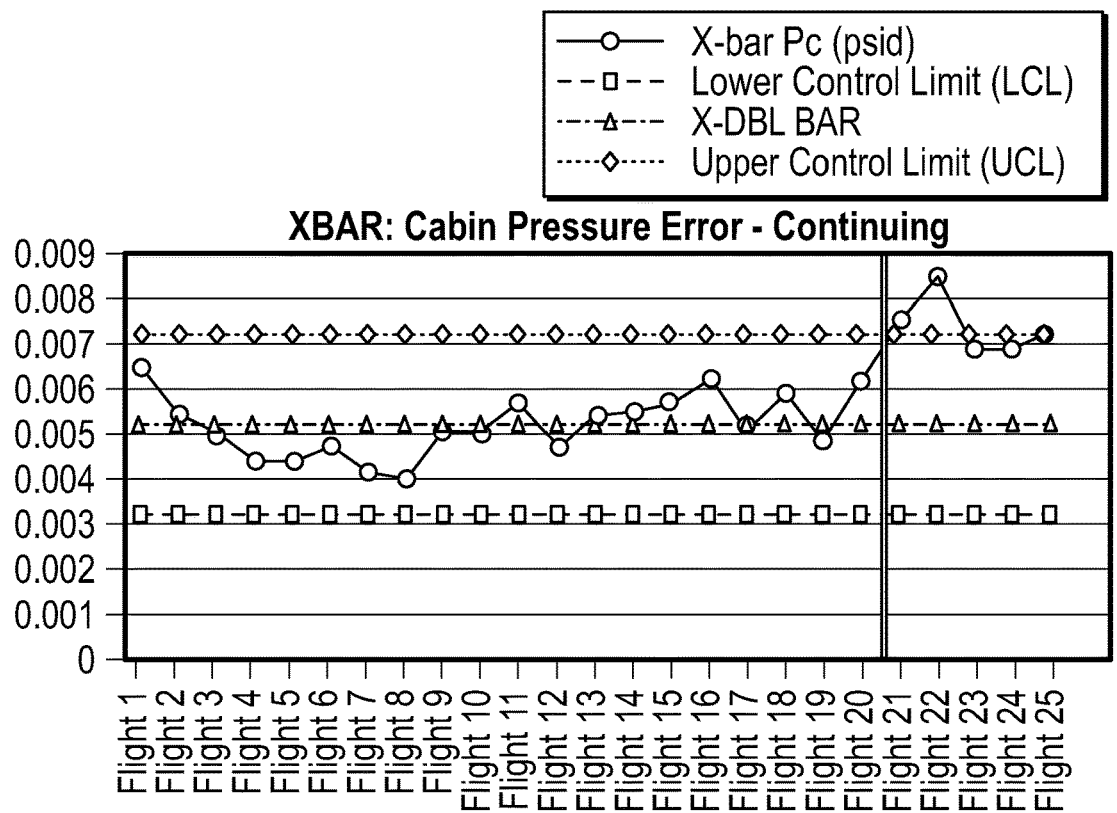
FIGS. 8A-8B are X-bar and R charts of continuing pressure error according to an embodiment of the present invention.
Figure 8B:
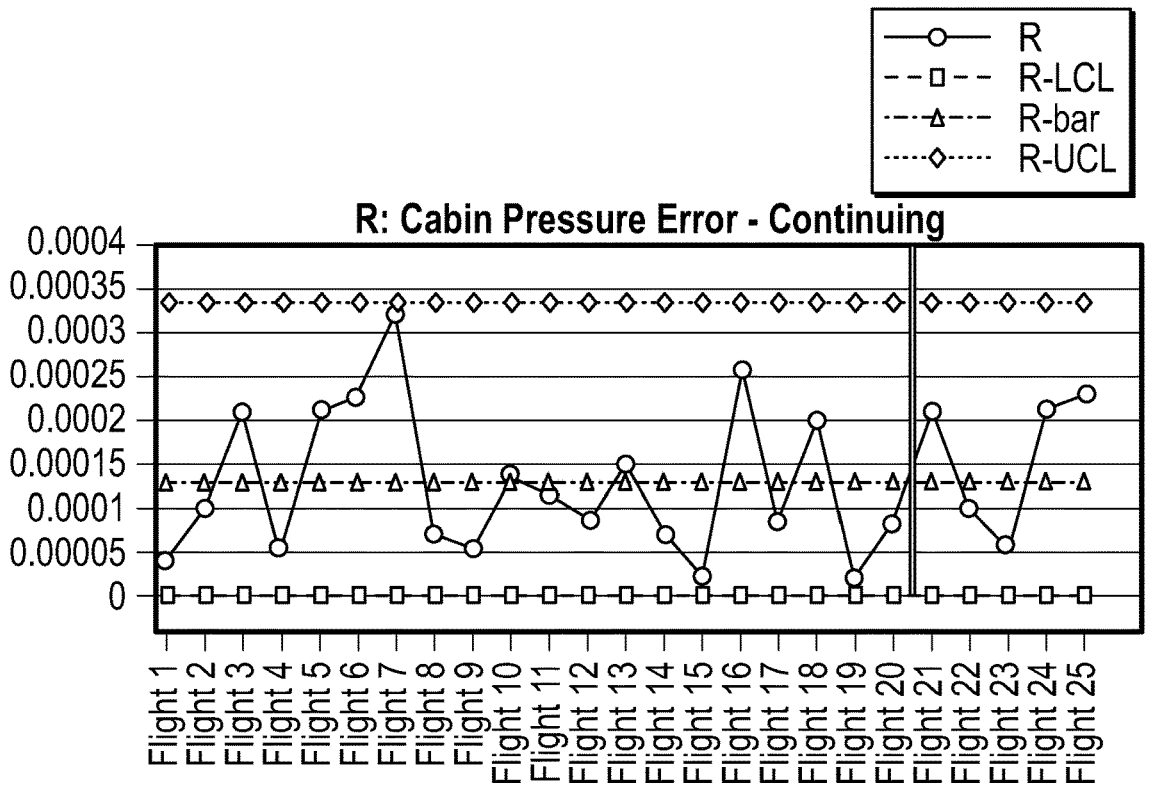

FIG. 7B is an R chart of the Cabin Pressure Rate Error data from the 20 original baseline flights.

Predictive Health Monitoring of Continuing Flight Data

This section provides an example of what would happen if, in subsequent flights, the cabin pressure sensor error or cabin pressure sensor noise was affected so that the resulting readings were not normal.

FIG. 10 is a table of data represents the original 20 flights for which the x-bar and R charts were developed. However, FIG. 10 now includes 5 additional flights of sample data where sensor performance was degraded (see flights 21 through 25).

In the same way as described with the baseline Cabin Pressure Error X-bar and R charts, new Cabin Pressure Error and Cabin Pressure Rate Error X-bar and R charts were plotted with the 5 additional flights (FIGS. 8A-8B, 9A-9B).

Because the first 20 flights were used to "baseline" that particular sensor's performance, the original UCLs and LCLs were utilized as the standard (six-sigma standard distribution) to compare the "new" 5 flights of sensor data against (21 to 25).

In the Cabin Pressure Error plots (FIGS. 8A-8B), it is shown in the X-bar chart (FIG. 8A) that to the right of the vertical line, flights 21 through 25 exhibit a higher Cabin Pressure Error—showing the sensor has drifted—because the new "continuing" X-bar data consistently are near or above the UCL. This is not the result of a circuit noise, because the "range" between the sampled data remains within the R-chart UCL and LCL.

While the pressure sensor is not out of tolerance, it its showing a tendency to drift beyond the UCL and, therefore, may be predicted to drift further in the future. Thus, the predictive health monitoring system may wish to indicate this to the operator for future replacement of the CPC.

Figure 9A:
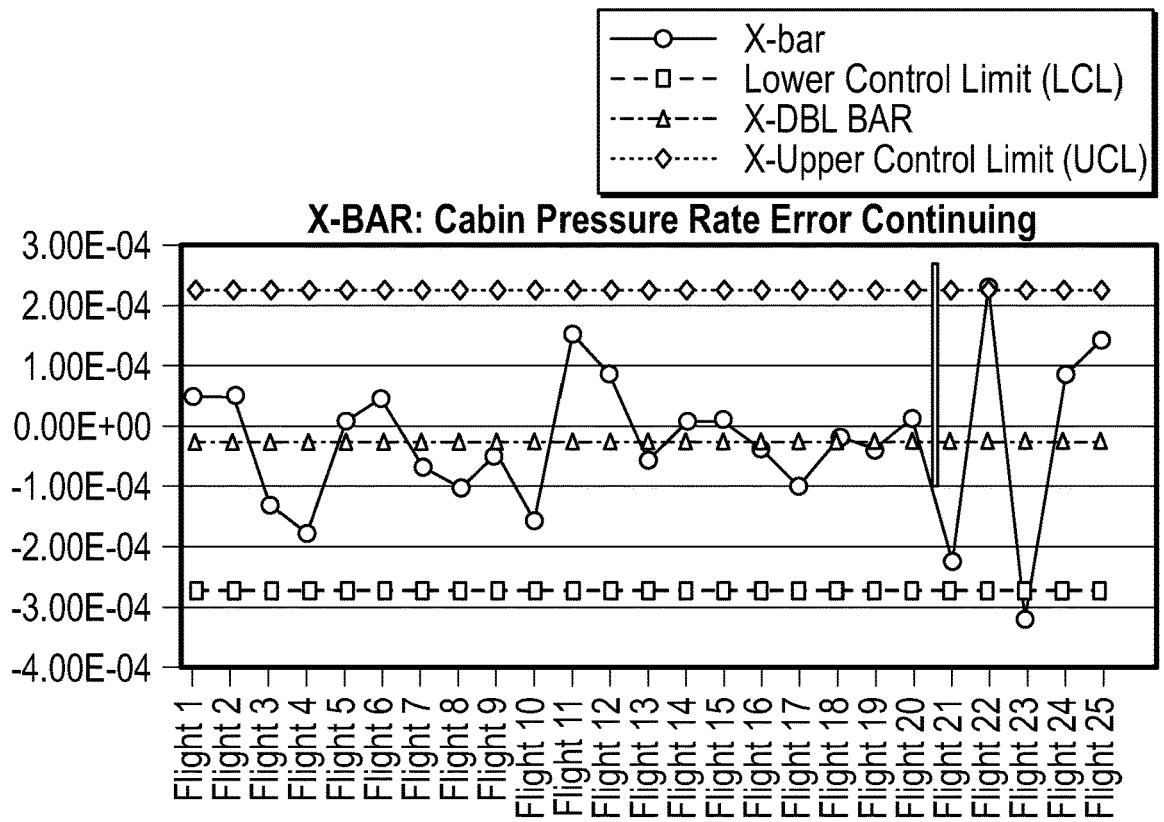
FIGS. 9A-9B are X-bar and R charts of continuing pressure rate error according to an embodiment of the present invention.
Figure 9B:
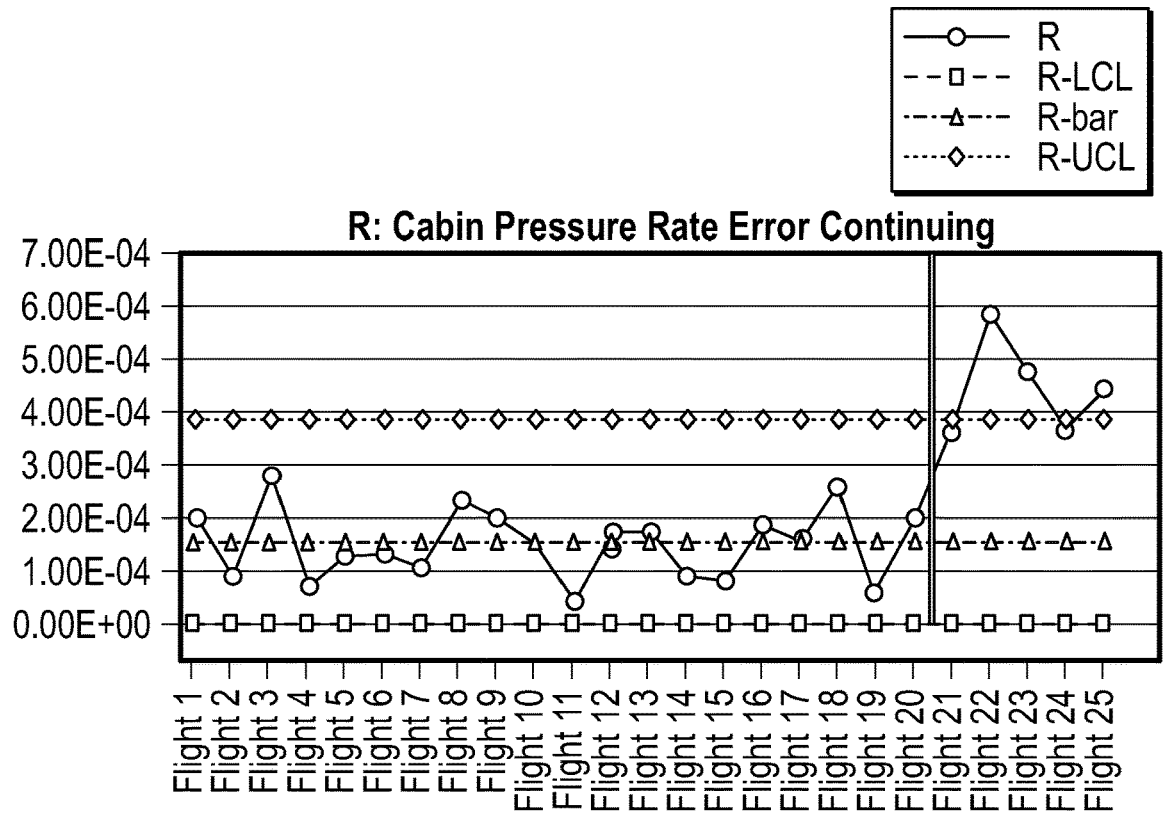

In FIG. 9A, for the Cabin Pressure Rate Error X-bar plot, flights 21 through 25 indicate that the Cabin Pressure Rate Error is no longer acting with central tendency, but is trending towards the UCL and LCL.

However, in the Cabin Pressure Rate Error R chart (FIG. 9B), these flights (21 to 25) show an upward tendency in the "range" between the sampled data. This means that the consecutively sampled rate readings (each 0.050-seconds) were changing greater than normal between the 3 samples. This indicates that there is circuit noise that results in erratic readings.

This invention could identify this situation before the erratic sensor resulted in enough rate noise to actually effect the cabin pressure control.

It should be understood, of course, that the foregoing relates to exemplary embodiments of the invention and that modifications may be made without departing from the spirit and scope of the invention as set forth in the following claims.

We claim:

1. A pressure control system for a pressurized environment, the system comprising:
    a controller configured to calculate at least one of:
        a pressure sensor rate of change error; or
        a pressure sensor error;
    wherein the pressure sensor rate of change error is based on a plurality of first environment air pressure signals over a first time period, and
    wherein the pressure sensor error is based, over a second time period, on a difference between ambient air pressure signals and second environment air pressure signals; and
    a processor in communication with the controller and configured to compare at least one of:
        the pressure sensor rate of change error with at least one pressure sensor rate of change error control limit; or
        the pressure sensor error with at least one pressure sensor error control limit,
        wherein the at least one pressure sensor rate of change error control limit is based on past pressure sensor rate of change errors and
        wherein the at least one pressure sensor error control limit is based on past pressure sensor errors.

2. The system of claim 1, wherein the controller calculates the pressure sensor rate of change error when the pressurized environment is open to ambient atmosphere.

3. The system of claim 1, wherein the controller calculates the pressure sensor error when the pressurized environment is open to ambient atmosphere.

4. The system of claim 1, wherein the controller is configured to calculate both the pressure sensor rate of change error and the pressure sensor error.

5. The system of claim 1, wherein the first time period is the same as the second time period.

6. The system of claim 1, wherein the first time period is different from the second time period.

7. The system of claim 1, wherein:
    the at least one pressure sensor rate of change error control limit is at least one of an upper control limit or a lower control limit; and
    the at least one pressure sensor rate of change error control limit is a statistical limit.

8. The system of claim 1, wherein:
    the at least one pressure sensor error control limit is at least one of an upper control limit or a lower control limit; and
    the at least one pressure sensor error control limit is a statistical limit.

9. A pressure control system for an environment, within an enclosure, the system comprising:
    an environmental pressure sensor;
    an ambient air pressure sensor;
    a controller in communication with the environmental and ambient air pressure sensors and configured to calculate:
        a pressure sensor rate of change error; and
        a pressure sensor error;
    wherein the pressure sensor rate of change error is based on a plurality of rate environment air pressure signals, and
    wherein the pressure sensor error is based on a plurality of pressure differentials between ambient air pressure signals and environment air pressure signals;
    a database that stores:
        an upper pressure sensor rate of change error control limit for the environmental sensor;
        a lower pressure sensor rate of change error control limit for the environmental sensor;
        an upper pressure sensor error control limit for the environmental sensor;
        a lower pressure sensor error control limit for the environmental sensor; and
    a processor in communication with the database and the controller, wherein the processor is configured to:
        compare the pressure sensor rate of change error with at least one of the upper pressure sensor rate of change error control limit or the lower pressure sensor rate of change error control limit;
        compare the pressure sensor error with at least one of the upper sensor error control limit or the lower sensor error control limit; and
        predict when the environmental pressure sensor should be repaired or replaced based on the comparison.

10. The system of claim 9, wherein:
    the environment is a cabin;
    the enclosure is an aircraft;
    the controller is inside of the aircraft; and
    the processor is outside of the aircraft.

11. The system of claim 9, wherein the database further comprises:
    average data and range data, both of which are sequentially ordered, for the upper and the lower pressure sensor rate of change error control limits; and average data and range data, both of which are sequentially ordered, for the upper and the lower pressure sensor error control limits.

12. The system of claim 9, wherein the upper and lower pressure sensor rate of change error control limits are updated over time.

13. The system of claim 9, wherein the upper and lower pressure sensor error control limits are updated over time.

14. The system of claim 9, wherein the processor is configured to calculate the upper and the lower sensor pressure rate of change error control limits based on the pressure sensor rate of change error.

15. The system of claim 9, wherein the processor is configured to calculate the upper and the lower pressure sensor error control limits based on the pressure sensor error.

16. The system of claim 9, wherein:
the environmental sensor has a unique identifier;
the upper and the lower pressure sensor rate of change error control limits are associated with the identifier; and
the upper and the lower pressure sensor error control limits are associated with the identifier.

17. A non-transitory computer readable medium with computer executable instructions stored thereon, executed by a processor, to perform a method for controlling pressure in an environment within an enclosure, the method comprising:
sampling ambient air pressure outside of the enclosure;
sampling environment air pressure inside of the environment;
based on one or both of the sampled ambient air pressure and the sampled environment air pressure, calculating at least one of a pressure sensor error or a pressure sensor rate of change error;
determining, by a processor, at least one of an upper pressure sensor error control limit, a lower pressure sensor error control limit, an upper pressure sensor rate of change error control limit, or a lower pressure sensor rate of change error control limit;
comparing, by the processor, at least one of:
the pressure sensor error with the upper pressure sensor error control limit;
the pressure sensor error with the lower pressure sensor error control limit;
the pressure sensor rate of change error with the upper pressure sensor rate of change error control limit; or
the pressure sensor rate of change error with the lower pressure sensor rate of change error control limit; and
predicting a failure of a pressure sensor in communication with the environment based on the comparison.

18. The method of claim 17, wherein determining the at least one of the upper pressure sensor error control limit, the lower pressure sensor error control limit, the upper pressure sensor rate of change error control limit, or the lower pressure sensor rate of change error control limit comprises determining the upper pressure sensor error control limit or the lower pressure sensor error control limit based on a plurality of consecutively measured sensor errors.

19. The method of claim 17, wherein determining the at least one of the upper pressure sensor error control limit, the lower pressure sensor error control limit, the upper pressure sensor rate of change error control limit, or the lower pressure sensor rate of change error control limit comprises determining the upper pressure sensor rate of change control limit or the lower pressure sensor rate of change control limit based on using a plurality of consecutively measured sensor rate of change errors.

20. The method of claim 17, wherein the processor is outside of the enclosure.

* * * * *